(12) United States Patent
Yagishita et al.

(10) Patent No.: US 7,046,387 B1
(45) Date of Patent: May 16, 2006

(54) EFFICIENT CODING OF COLOR IMAGES INCLUDING MONOCHROME IMAGES

(75) Inventors: Takahiro Yagishita, Kanagawa (JP); Yukiko Yamazaki, Kanagawa (JP); Nekka Matsuura, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 942 days.

(21) Appl. No.: 09/664,832

(22) Filed: Sep. 19, 2000

(30) Foreign Application Priority Data

Sep. 20, 1999 (JP) .................................. 11-266318
Aug. 31, 2000 (JP) .............................. 2000-264422

(51) Int. Cl.
*G06K 15/00* (2006.01)

(52) U.S. Cl. ...................... 358/1.16; 358/539; 358/530; 358/426.13; 382/232; 382/235; 382/251; 382/166; 345/604; 345/543

(58) Field of Classification Search ........ 382/243–245, 382/232, 235, 253, 163–164, 166; 358/1.16, 358/1.4, 539, 518, 530; 345/603, 619; 400/120.02; 375/240.25
See application file for complete search history.

(56) References Cited

U.S. PATENT DOCUMENTS

| | | | |
|---|---|---|---|
| 4,819,063 A * | 4/1989 | Sugiura et al. | 358/530 |
| 4,875,063 A | 10/1989 | Idenawa et al. | |
| 4,918,489 A | 4/1990 | Inage et al. | |
| 4,977,414 A | 12/1990 | Shimada et al. | |
| 5,018,008 A * | 5/1991 | Asada | 358/518 |
| 5,019,913 A | 5/1991 | Kiya et al. | |
| 5,107,278 A | 4/1992 | Shimada et al. | |
| 5,383,037 A * | 1/1995 | Kimura et al. | 358/539 |
| 5,491,506 A | 2/1996 | Yagishita et al. | |
| 5,565,907 A | 10/1996 | Wada et al. | |
| 5,672,016 A * | 9/1997 | Miyano | 400/120.02 |
| 5,740,277 A * | 4/1998 | Katto | 382/232 |
| 5,909,505 A * | 6/1999 | Katayama et al. | 382/164 |
| 5,923,828 A | 7/1999 | Yagishita | |
| 5,987,166 A * | 11/1999 | Hayashi et al. | 382/163 |
| 5,990,876 A * | 11/1999 | Shyu | 345/603 |
| 6,052,205 A | 4/2000 | Matsuura | |
| 6,118,552 A * | 9/2000 | Suzuki et al. | 382/166 |
| 6,144,763 A * | 11/2000 | Ito | 382/166 |

(Continued)

FOREIGN PATENT DOCUMENTS

JP 2520891 5/1996

(Continued)

OTHER PUBLICATIONS

U.S. Appl. No. 09/085,714, filed May 28, 1998, Allowed.

(Continued)

*Primary Examiner*—Kimberly Williams
*Assistant Examiner*—Beniyam Menberu
(74) *Attorney, Agent, or Firm*—Oblon, Spivak, McClelland, Maier & Neustadt, P.C.

(57) ABSTRACT

A device for processing images includes a compressing/coding unit which encodes image data including a plurality of color components to produce fixed-length codes, a memory unit which stores therein the codes produced by the compressing/coding unit, a distribution-measurement unit which measures a distribution of the color components concurrently with the encoding of the image data performed by the compressing/coding unit, and a memory-control unit which releases a memory space assigned to part of the codes relating to colors in the memory unit if the distribution-measurement unit detects that the distribution concentrates on a particular color composition, and records data indicative of the particular color composition in the memory unit.

27 Claims, 10 Drawing Sheets

U.S. PATENT DOCUMENTS

| | | | |
|---|---|---|---|
| 6,580,523 B1 * | 6/2003 | Yoshimoto et al. | 358/1.4 |
| 6,593,935 B1 * | 7/2003 | Imaizumi et al. | 345/619 |
| 2003/0133506 A1 * | 7/2003 | Haneda | 375/240.25 |

FOREIGN PATENT DOCUMENTS

| | | |
|---|---|---|
| JP | 2618944 | 3/1997 |

OTHER PUBLICATIONS

U.S. Appl. No. 09/073,873, filed May 7, 1998, Pending.
U.S. Appl. No. 09/282,456, filed Mar. 31, 1999, Pending.
U.S. Appl. No. 09/330,007, filed Jun. 11, 1999, Pending.
U.S. Appl. No. 09/401,503, filed Sep. 22, 1999, Pending.
U.S. Appl. No. 09/455,923, filed Dec. 7, 1999, Pending.
U.S. Appl. No. 09/565,545, filed May 5, 2000, Pending.
U.S. Appl. No. 09/945,840, filed Sep. 5, 2001, Unknown.
U.S. Appl. No. 09/664,832, filed Sep. 19, 2000, Pending.
U.S. Appl. No. 10/153,654, filed May 24, 2002, Pending.
U.S. Appl. No. 10/230,090, filed Aug. 29, 2002, Pending.
U.S. Appl. No. 09/664,832, filed Sep. 19, 2000, Yagishita et al.
U.S. Appl. No. 10/379,533, filed Mar. 6, 2003, Takeyama et al.
U.S. Appl. No. 10/461,399, filed Jun. 16, 2003, Sugiura et al.
U.S. Appl. No. 10/617,193, filed Jul. 11, 2003, Yamazaki et al.
U.S. Appl. No. 10/769,855, filed Feb. 3, 2004, Watanabe et al.
U.S. Appl. No. 10/875,277, filed Jun. 25, 2004, Shoji et al.
U.S. Appl. No. 10/986,781, filed Nov. 15, 2004, Matsuura et al.

* cited by examiner

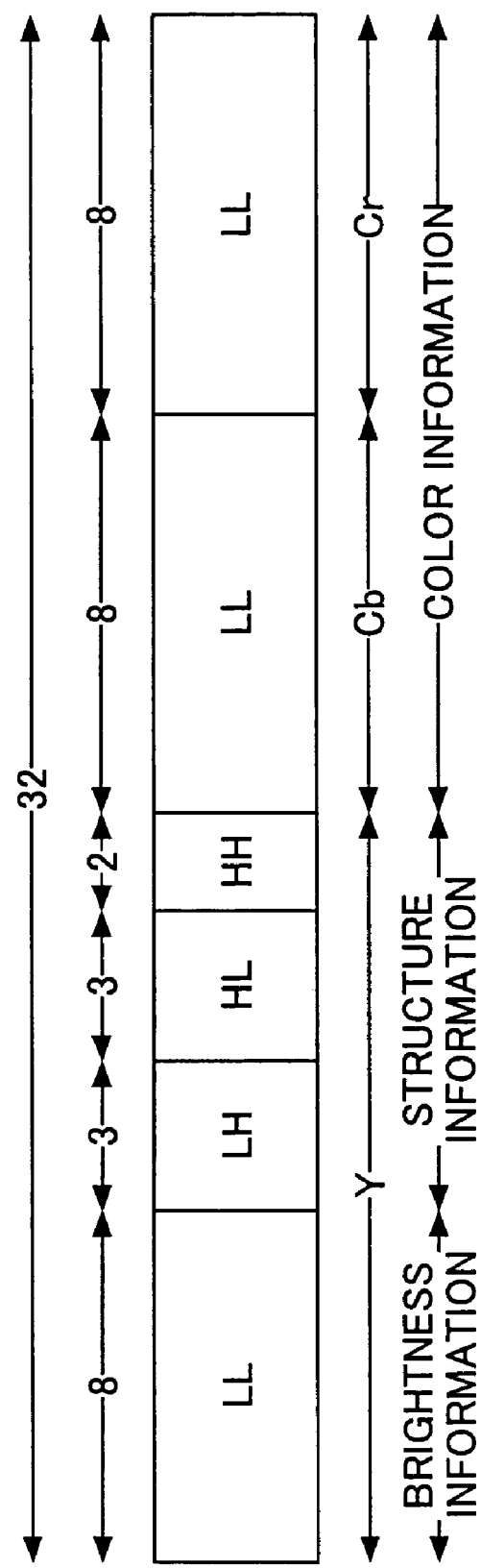

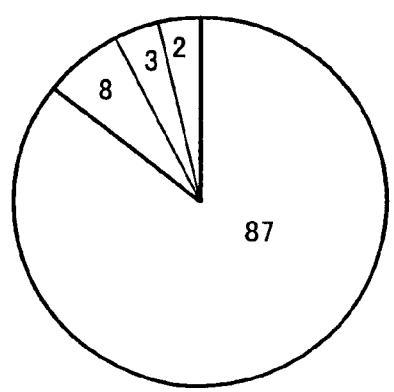

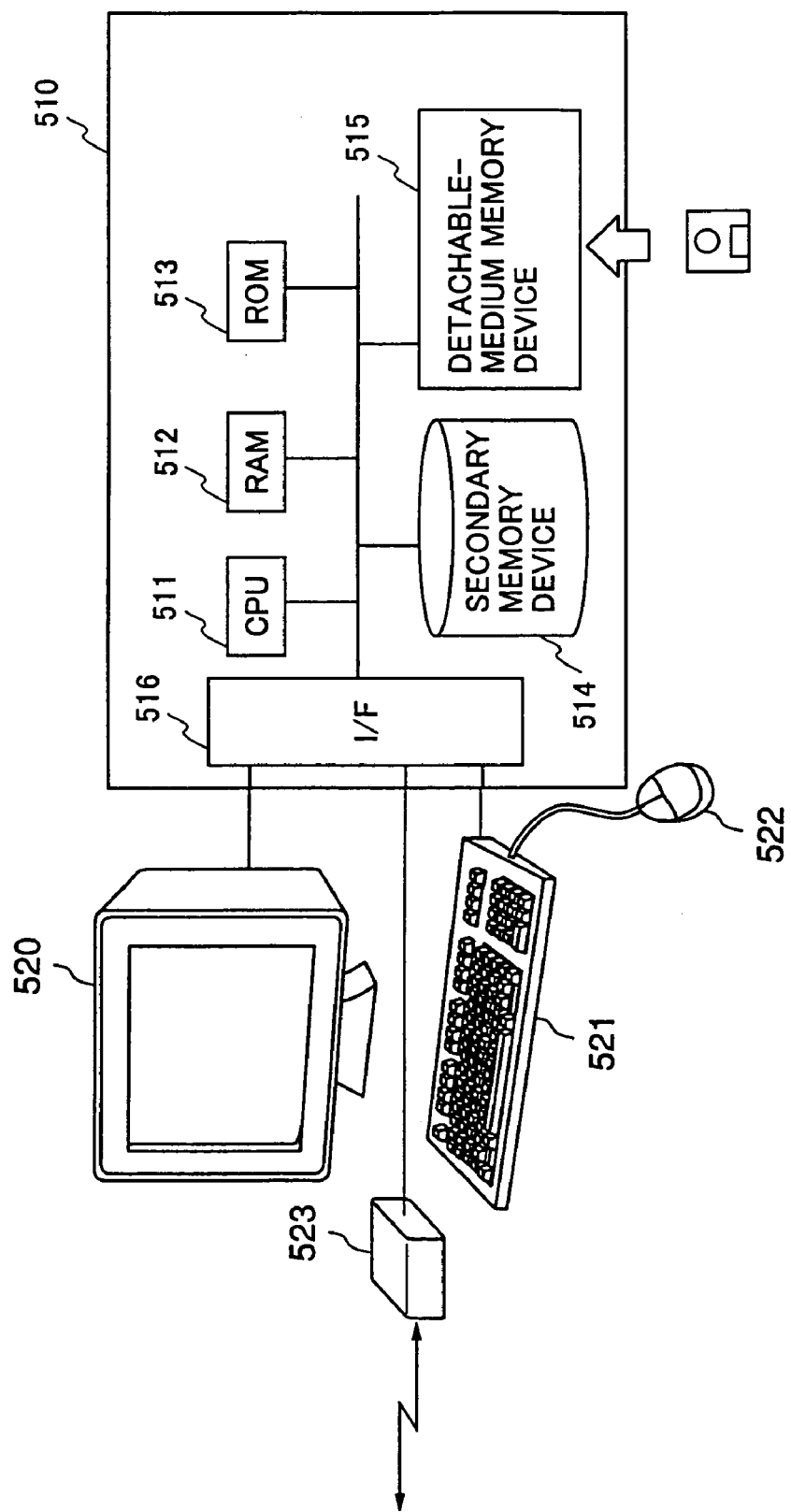

EFFICIENT CODING OF COLOR IMAGES INCLUDING MONOCHROME IMAGES

BACKGROUND OF THE INVENTION

1. Field of the Invention

The present invention generally relates to image processing devices, and particularly relates to an image processing devices which compresses and encodes color images.

2. Description of the Related Art

In the field of data processing and data communication, data compression and encoding techniques are widely used for the purpose of reducing memory size required for storing image data and of shortening transmission time when transmitting image data.

In image forming devices such as digital copiers, there is a need to perform editing processes at high speed within limited memory space, such editing processing including rotation, combination, superimposition, size change, etc., of images, and fixed-length compressing and encoding techniques are employed to this end. This is because a fixed-length encoding results in memory addresses of stored encoded data being easily identified with respect to a position of interest within the image to be edited. Further, in the case of digital copiers having a function of electric sorting, there is a need to store a plurality of images in a memory, resulting in a need for large memory size.

In general, the amount of information representing a monochrome image is smaller than the amount of information representing a color image. Use of appropriate encoding schemes results in a higher coding rate being obtained for the monochrome image. Devices for processing color image data do not always process color images, but occasionally process monochrome images. Applying the same encoding technique to monochrome images as applied to color images is not desirable in terms of coding efficiency. Accordingly, it is desirable to use different encoding schemes for monochrome images and color images, respectively.

An image coding device disclosed in Japanese Patent No. 2,520,891 checks whether each block obtained by dividing an input image is a monochrome image or a color image. If a block is ascertained as a monochrome image, brightness information of the coded image data can be stored in an increased amount as color information does not exist in a monochrome image. Further, the memory space spared by absence of color information may be used for storing brightness information of the next block. If not necessary to exploit all the spared space, filler bits may be placed without a concern for a decrease in efficiency.

Further, an image coding device disclosed in Japanese Patent No. 2,618,944 increases the number of quantization bits for brightness information in monochrome blocks so as to have the same number of quantization bits for one monochrome block as for one color block. Alternatively, the number of quantization bits for brightness information in monochrome blocks is set to half the number of quantization bits for brightness information in color blocks, thereby adjusting the total number of bits in image blocks.

The image coding devices disclosed in Japanese Patent No. 2,520,891 and in Japanese Patent No. 2,618,944 employ different encoding schemes between monochrome images and color images, so that separate encoding means are necessary for respective images. Further, an improvement in coding efficiency is attained only when an image is comprised of a predetermined single color, so that the field of application is not as wide as desired. When an encoding technique that outputs a shorter length of codes for monochrome (black and white) images is applied to a blue only image, such an encoding technique does not produce a shorter length of codes, failing to achieve an improvement in coding efficiency. If an attempt is made to check the color of the image, an extra time becomes necessary for such data processing, thereby hampering efforts toward high-speed encoding processing. If the distribution of color components is measured throughout the entire image prior to commencement of the encoding processing, for example, the start of encoding processing must be delayed by the time length required for such data processing.

Further, when a single image contains monochrome blocks as well as color blocks, the resulting codes for each block may differ from block to block. Namely, features of fixed-length coding are lost, with increased difficulties in performing various editing processes on the image data.

Accordingly, there is a need for an image processing device which can encode image data including color images and monochrome images at high speed and at high coding rate.

SUMMARY OF THE INVENTION

It is a general object of the present invention to provide an image processing device that substantially obviates one or more of the problems caused by the limitations and disadvantages of the related art.

Features and advantages of the present invention will be set forth in the description which follows, and in part will become apparent from the description and the accompanying drawings, or may be learned by practice of the invention according to the teachings provided in the description. Objects as well as other features and advantages of the present invention will be realized and attained by the image processing device particularly pointed out in the specification in such full, clear, concise, and exact terms as to enable a person having ordinary skill in the art to practice the invention.

To achieve these and other advantages and in accordance with the purpose of the invention, as embodied and broadly described herein, the invention provides a device for processing images including a compressing/coding unit which encodes image data including a plurality of color components to produce fixed-length codes, a memory unit which stores therein the codes produced by the compressing/coding unit, a distribution-measurement unit which measures a distribution of the color components concurrently with the encoding of the image data performed by the compressing/coding unit, and a memory-control unit which releases a memory space assigned to part of the codes relating to colors in the memory unit if the distribution-measurement unit detects that the distribution concentrates on a particular color composition, and records data indicative of the particular color composition in the memory unit.

In the device described above, a check as to whether the input image is a monochrome image is performed concurrently and in parallel with the process of compressing and encoding the image, and part of the memory space relating to the color codes is released in response to the check results indicative of a monochrome image after the compressed and encoded codes are stored in the memory. This improves coding efficiency for monochrome images. Further, since the check processing and the compression and encoding processing are carried out simultaneously, no extra time for the sake of performing the checking process is necessary, thereby achieving high-speed and efficient coding. Further, since the data indicative of the particular color composition is stored in the memory unit in the case of a monochrome image, the original image can be correctly reconstructed at the time of decoding processes despite the deletion of the color codes.

The present invention is also directed to an image processing system, an image coding method, and a memory medium having a program recorded therein for practicing the image coding method, as will be described in the following description.

BRIEF DESCRIPTION OF THE DRAWINGS

FIG. 3 is an illustrative drawing showing an example of bit assignment to sub-band-conversion coefficients;

FIG. 4A is an illustrative drawing showing areas of counting used when the distribution of chrominance components are counted;

FIG. 4B is an illustrative drawing showing an example of counting results obtained by counting the distribution of chrominance components;

FIG. 5 is a chart showing an example of the distribution of chrominance components;

FIG. 11 is an illustrative drawing showing a configuration of a device that performs the image processing method of the present invention.

DESCRIPTION OF THE PREFERRED EMBODIMENTS

In the following, embodiments of the present invention will be described with reference to the accompanying drawings.

Figure 1:
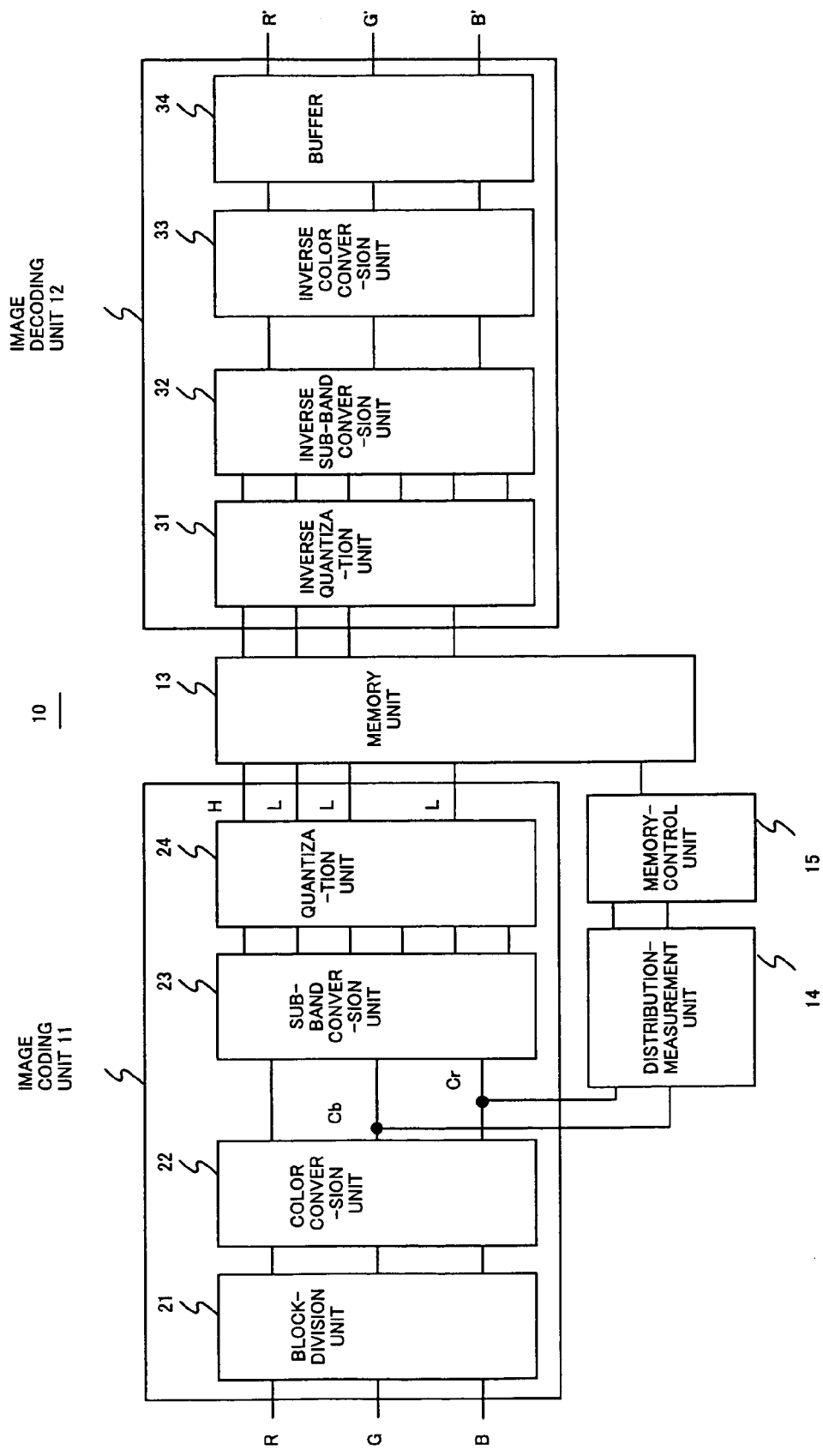
FIG. 1 is a block diagram of an image processing device according to a first embodiment of the present invention.

FIG. 1 is a block diagram of an image processing device according to a first embodiment of the present invention.

The image processing device 10 of FIG. 1 includes an image coding unit 11, an image decoding unit 12, a memory unit 13, a distribution-measurement unit 14, and a memory-control unit 15.

RGB image data read by a scanner or the like is encoded and compressed by the image coding unit 11 so as to produce fixed-length codes, which are stored in the memory unit 13. In the memory unit 13, editing processes such as rotation, combination, size change, etc., are performed on the images if necessary. At the time of printing, the data stored in the memory unit 13 is returned to the original RGB data by the image decoding unit 12. Thereafter, the image data is subjected to image-quality correction, color-conversion into CMYK data, gray-level correction, etc., followed by being supplied to and printed by a printer.

The image coding unit 11 includes a block-division unit 21, a color conversion unit 22, a sub-band conversion unit 23, and a quantization unit 24. The image decoding unit 12 includes an inverse quantization unit 31, an inverse sub-band conversion unit 32, an inverse color conversion unit 33, and a buffer unit 34.

In FIG. 1, the color image signals (R, G, B) read by the scanner or the like are supplied to the image coding unit 11 as raster scans. The block-division unit 21 of the image coding unit 11 temporarily buffers the color image signals (R, G, B), and, then, cuts out a portion of image data by a block unit such as a 2-pixel-by-2-pixel block unit. Each block of the image data is supplied to the data encoding and compressing processing at the subsequent stages.

The color conversion unit 22 of the image coding unit 11 linearly converts the RGB data supplied block by block into color-space signals Y, Cb, and Cr representing brightness and chrominance. This linear conversion is shown in the following.

$$Y = 0.30\,R + 0.59\,G + 0.11\,B$$

$$Cb = 0.56\,(B-Y)$$

$$Cr = 0.71\,(R-Y)$$

In association with this, the inverse color conversion unit 33 of the image decoding unit 12 performs the inverse of the conversion shown above by equations as follows.

$$R = Y + 2(1 - 0.299)Cr$$

$$B = Y + 2(1 - 0.114)Cb$$

$$G = (Y - 0.299R - 0.114B)/0.587$$

When the color conversion unit 22 of the image coding unit 11 performs the color conversion as described above, statistical power of images is concentrated on the luminance signal Y, thereby reducing entropy.

Thereafter, the sub-band conversion unit 23 of the image coding unit 11 attends to sub-band conversion of the Y, Cb, and Cr signals obtained by the color conversion. The following is one of the simplest examples of the sub-band conversion.

$$\text{LPF: } S(n) = (x(2n) + x(2n+1))/2$$

$$\text{HPF: } D(n) = x(2n) - x(2n+1)$$

The inverse of this sub-band conversion is carried out by the following equations.

$$x(2n) = S(n) + D(n)/2$$

$$x(2n+1) = S(n) - D(n)/2$$

Figure 2:
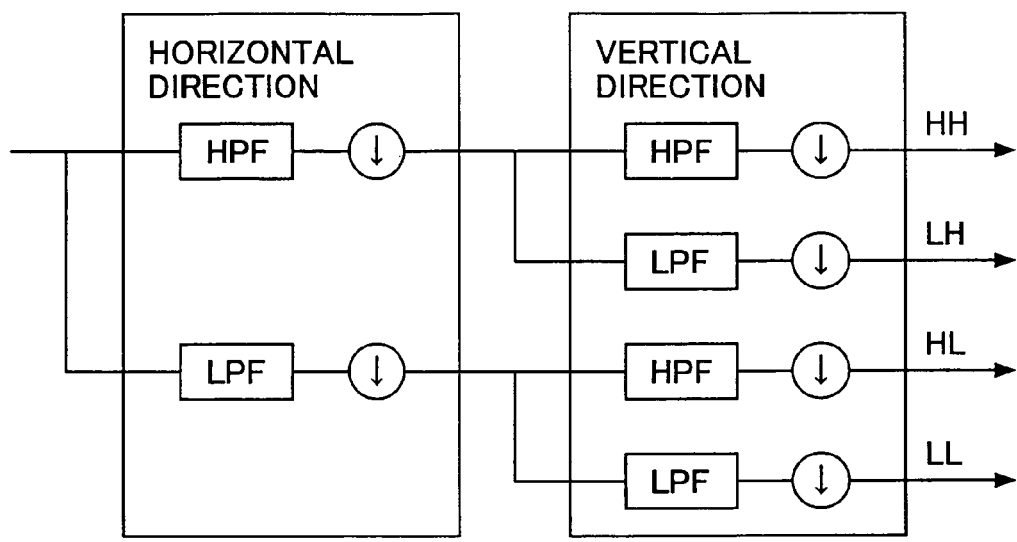
FIG. 2 is an illustrative drawing for explaining an example of sub-band conversion.

FIG. 2 is an illustrative drawing for explaining the example of the sub-band conversion.

In FIG. 2, the high-pass filter $D(n)$ is applied to an original image in a horizontal direction. Concurrently with this filtering, the low-pass filter $S(n)$ is applied to the original image in the horizontal direction. Thereafter, the high-pass filter $D(n)$ is further applied in a vertical direction to the outputs of the high-pass filter $D(n)$ applied in the horizontal direction to obtain diagonal high-band components HH, and the low-pass filter $S(n)$ is concurrently applied to obtain vertical high-band components LH. Further, the high-pass filter $D(n)$ is applied in the vertical direction to the outputs of the low-pass filter $S(n)$ applied in the horizontal direction to obtain horizontal high-band components HL, and the low-pass filter S(n) is concurrently applied to obtain low-band components LL.

In this manner, the horizontal high-band components HL, the vertical high-hand components LH, the diagonal high-band components HH, and the low-band components LL are obtained as four frequency-band signals. Since power focuses on the low-band components LL, the low-band components LL tend to have relatively large values and contain the relatively large amount of information. If the sub-band conversion is applied to the low-band components LL recursively, further reductions in entropy can be attained.

The conversion coefficients obtained by the sub-band conversion unit 23 as described above are supplied to the quantization unit 24.

The quantization unit 24 quantizes the coefficients by using the predetermined numbers of quantization bits, and results of the quantization are stored in the memory unit 13. Here, the total number of quantization bits assigned to the conversion coefficients is fixed for one block.

FIG. 3 is an illustrative drawing showing an example of bit assignment to the sub-band-conversion coefficients by the quantization unit 24.

FIG. 3 shows a case in which a 2-pixel×2-pixel block with 8 bits per pixel is processed with respect to each of the R, G, and B colors (96 bits in total). After the color conversion and the sub-band conversion, the luminance signal Y has 8 bits assigned to LL thereof, 3 bits assigned to HL and LH thereof, and 2 bits assigned to HH thereof. Further, each of the chrominance signals Cb and Cr has 8 bits assigned to LL thereof and 0 bit assigned to HL, LH, and HH components thereof. As a result, the total number of quantization bits is 32 in this case. Since the number of bits in the original image block is 96 bits, the rate of compression in this case is 3 (=32/96).

Here, the low-band components LL of the luminance signal Y are brightness information indicative of brightness of a given block, and the HL, LH, and HH components of the luminance signal Y are structure information indicative of spatial luminance pattern within the given block. Further, the low-band components LL of the chrominance signals Cb and Cr are color information representing colors of the given block.

As shown in FIG. 3, the quantization unit 24 assigns the predetermined numbers of bits to the respective components so as to achieve a fixed-length compression of each block. Because of this, it is easy to obtain addresses at the time of editing of images stored in the memory unit 13, thereby making it possible to achieve high-speed processing.

As long as the total number of bits assigned to each block is constant, it is not necessary to assign the fixed numbers of bits to respective components within a given block. Namely, assignment of bits to the components may be changed from block to block. When bit assignment is changed depending on locations within an image, the fixed-length coding can attain a further improvement in coding efficiency. In this case, area-attribute information indicative of areas may be added to the fixed-length codes.

As is described in connection with the description of the related art, a monochrome image comprised of only black and white or a single color such as blue may be entered in a device or system that is designed to handle color images. In such a case, it is desirable to perform compressing and encoding processing particularly appropriate for monochrome images.

In consideration of this, the present invention includes the distribution-measurement unit 14 as shown in FIG. 1. The distribution-measurement unit 14 measures the distribution of the chrominance components Cb and Cr over the entire image, and checks whether the obtained distribution has a concentration within a predetermined range. Namely, a check is made as to whether the distribution concentrates on a particular composition of color components. A composition of the chrominance components Cb and Cr determines a color. If the distribution concentrates on a particular composition of chrominance components, therefore, it is reasonable to ascertain that the input image is a monochrome image.

It should be noted that the distribution-measurement processing by the distribution-measurement unit 14 is concurrently performed with the compressing and encoding processing previously described.

FIG. 4A is an illustrative drawing showing areas of counting used when the distribution of the chrominance components Cb and Cr are counted. FIG. 4B is an illustrative drawing showing an example of the counting results obtained by counting the distribution of the chrominance components Cb and Cr.

As shown in FIG. 4A, the plane defined by the chrominance components Cb and Cr is divided into a plurality of areas corresponding to different compositions of colors (i.e., 24 areas corresponding to 24 different compositions of chrominance components in this example). Then, the number of occurrences is counted within each area with respect to the entirety of the image. It should be noted, however, that the area including the black-and-white monochrome (Cb=Cr=0) is not subjected to the counting. $C_1$ through $C_{24}$ in FIG. 4A indicate the numbers of occurrences in respective areas.

After the counting process as described above, a ratio of the largest count to the total count is obtained.

When the counts are standardized by the total count so as to represent ratios of counts to the total count, results as shown in FIG. 4B may be obtained. In an example of FIG. 4B, a ratio of the count $C_9$ to the total count is 87%, and this is the largest ratio. Namely, when the distribution concentrates on a particular composition of colors, it is ascertained that the input image is a monochrome image (i.e., a single color image).

FIG. 5 is a chart showing an example of the distribution of the chrominance components Cb and Cr.

As shown in FIG. 5, 87% of all the pixels belong to the same single area of the chrominance components in this example. Among the rest, 8% belong to another area of the chrominance components. A check is made a to whether the ratio of the maximum count to the total count as represented as 87% in this example exceeds a predetermined percentage.

Figure 6:
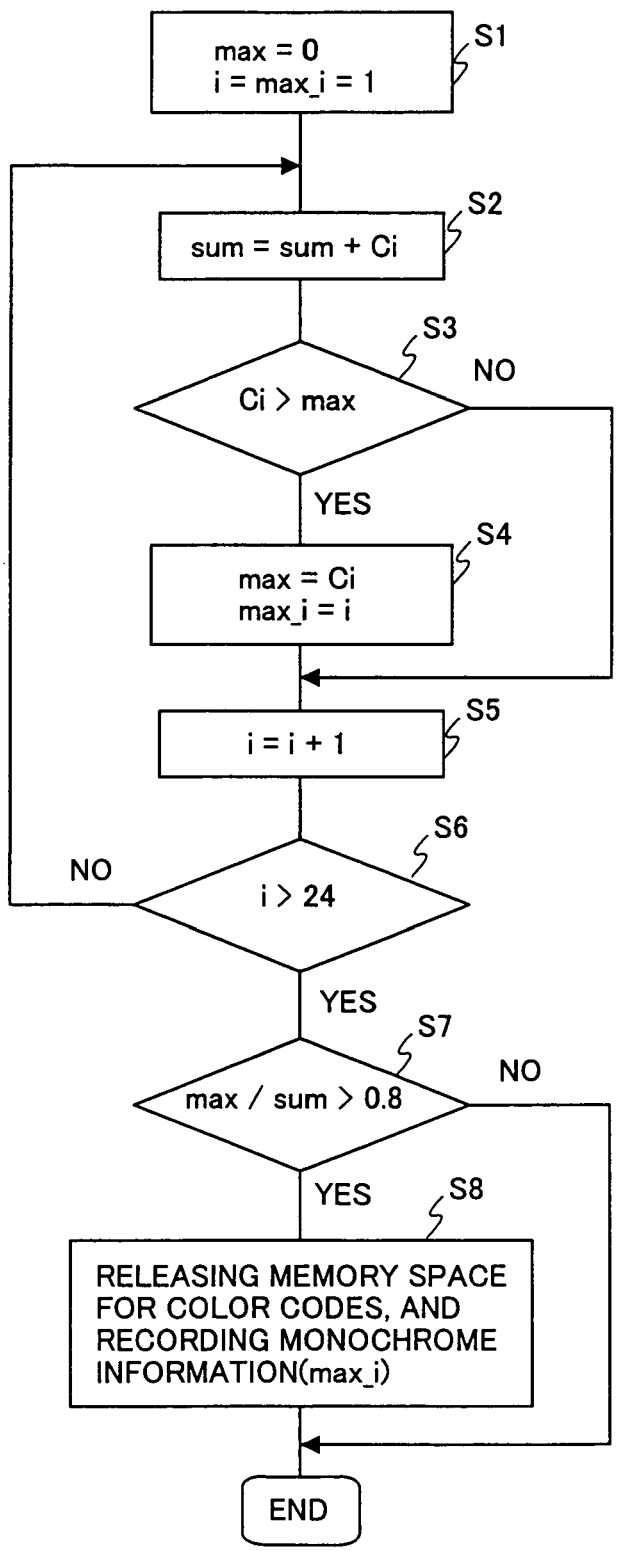
FIG. 6 is a flowchart showing a process of determining whether a ratio of a maximum count to a total count exceeds a predetermined value.

FIG. 6 is a flowchart showing a process of determining whether the ratio of the maximum count to the total count exceeds a predetermined value.

In FIG. 6, "$C_i$" represents the number of occurrences in each area obtained by dividing the plane defined by the chrominance components Cb and Cr, and "sum" indicates a total sum of occurrences. Further, "max" represents a maximum count, and "max_i" is an index indicative of an area that has the maximum count.

At a step S1, "max" is set to 0, and "max_i" and a parameter "i" are set to 1.

At a step S2, the number of occurrences $C_i$ is added to the sum "sum" so as to obtain the total sum of the occurrences that have been counted so far.

At a step S3, a check is made as to whether the number of occurrences $C_i$ is greater than the maximum count "max"

that has obtained so far. If it is greater, the procedure goes to a step S4. Otherwise, the procedure skips the step S4.

At the step S4, the number of occurrences $C_i$ is recorded as a new maximum count "max", and the index "max_i" indicative of an area that marked the maximum count is set to "i".

At a step S5, "i" is incremented by one.

At step S6, a check is made as to whether "i" is greater than, for example, 24 as follows: If "i" is greater than, for example, 24, the procedure goes to step S7; otherwise, the procedure goes back to step S2.

At a step S7, a check is made as to whether the ratio of the maximum count to the total sum (max/sum) exceeds 80%. If the ratio exceeds 80%, it is ascertained that the input image is monochrome image, and the procedure goes to a step S8. If the ratio goes below 80%, it is ascertained that the input image is not a monochrome image, and the procedure comes to an end. It should be noted that the threshold does not have to be 80%, and may be any appropriate value assigned in advance.

At a step S8, a memory space for color information is released, and the information "max_i" regarding the composition of colors of the monochrome image is stored in the memory.

Then, the procedure comes to an end.

The process at the step S8 is carried out by the memory-control unit 15 of FIG. 1.

Figure 7:
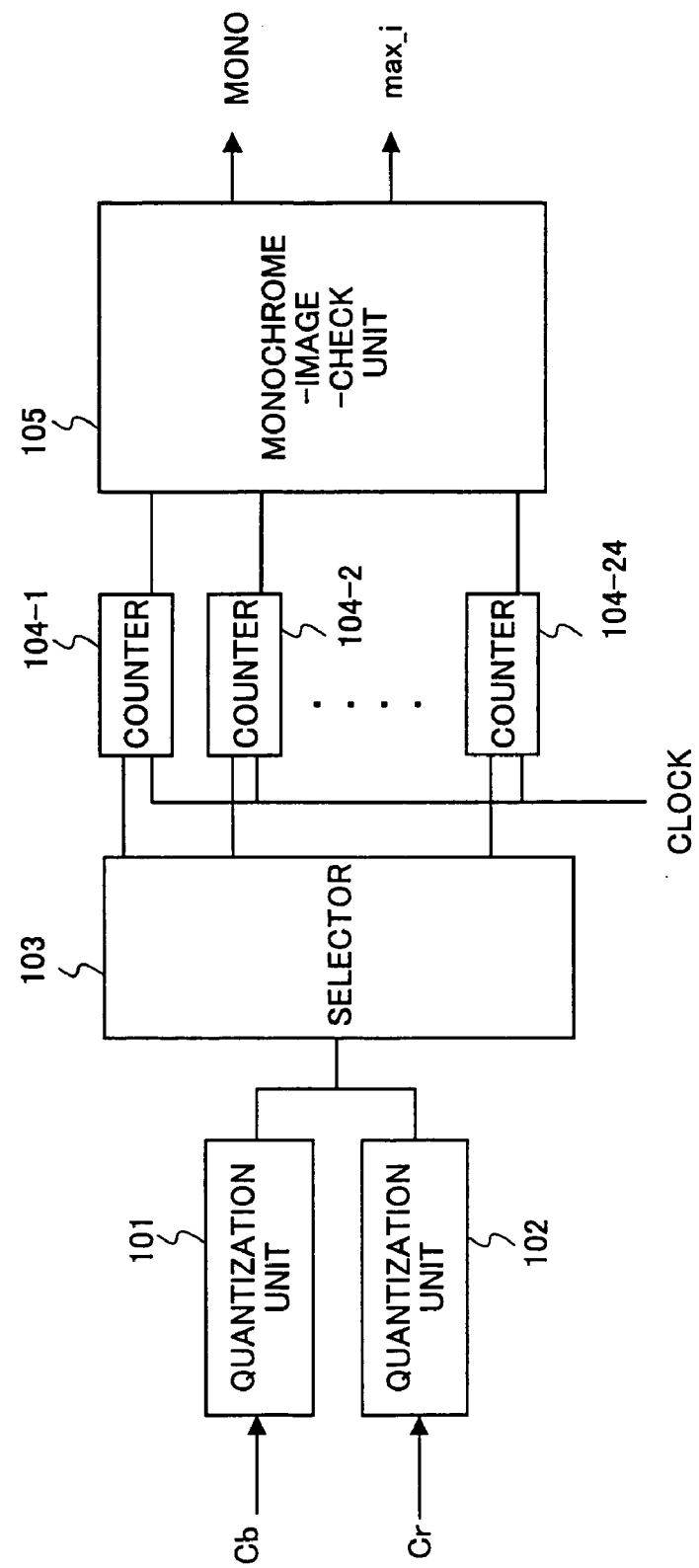
FIG. 7 is a block diagram showing an example of a configuration of a distribution-measurement unit shown in FIG. 1.

FIG. 7 is a block diagram showing an example of a configuration of the distribution-measurement unit 14.

The distribution-measurement unit 14 of FIG. 7 includes a quantization unit 101, a quantization unit 102, a selector 103, counters 104-1 through 104-24, and a monochrome-image-check unit 105. The quantization unit 101 and the quantization unit 102 receive the chrominance components Cb and Cr of each pixel from the color conversion unit 22, respectively, and quantize them. The number of bits after the quantization is 3 bits in this example, with the 3 bits obtained after the quantization of Cb representing 5 columns in the Cb direction as shown in FIG. 4A, and with the 3 bits obtained after the quantization of Cr representing 5 rows in the Cb direction. The 3 bits obtained after the quantization of Cb is combined with the 3 bits obtained after the quantization of Cr to generate 6 bit data, which are supplied to the selector 103 to select one of the 24 counters 104-1 through 104-24. Here, the counters 104-1 through 104-24 correspond to the 24 areas that are obtained by dividing the plane of the chrominance components shown in FIG. 4A.

A clock signal is supplied to the counters 104-1 through 104-24 as shown in FIG. 7. This clock signal is in synchronization with timings at which the chrominance data of each pixel is supplied from the color conversion unit 22 to the quantization units 101 and 102. When the chrominance data of a given pixel is supplied, the selector 103 selects a counter that corresponds to an area corresponding to the chrominance data. As a result, the selected counter is counted up by the clock signal.

As chrominance data of pixels are successively supplied, corresponding counters are successively selected and counted up until the counting operation for all the pixels is completed. Consequently, the numbers of occurrences are obtained with respect to the plurality of areas, which divide the plane defined by Cb and Cr.

The monochrome-image-check unit 105 receive respective counts from the counters 104-1 through 104-24, and obtains a maximum count, followed by checking whether the maximum count accounts for more than 80% of the total count. Namely, a check is made as to whether the maximum count that is the largest of all the counts obtained for the plurality of areas accounts for more than 80% of the total counts. If it accounts for more than 80%, the monochrome-image-check unit 105 outputs a A monochrome-indication signal MONO indicating that the input image is a monochrome image, and further outputs an index max_i indicative of an area that marked the maximum count. The index max_i represents a position of the area that corresponds to the maximum count among the 24 areas dividing the chrominance plane, and indicates the composition of color components of the input monochrome image. Hereinafter, the information represented by this index is referred to as monochrome information.

The monochrome-indication signal MONO and the monochrome information max_i are supplied to the memory-control unit 15. The memory-control unit 15 controls writing of code data at specified addresses in the memory unit 13 when the code data is supplied from the quantization unit 24. The memory-control unit 15 further controls the memory unit 13 to release a memory space for chrominance codes if the monochrome-indication signal MONO indicates that the input image is a monochrome image. Further, the memory-control unit 15 controls the memory unit 13 to write the monochrome information max_i at a predetermined address.

Figure 8:
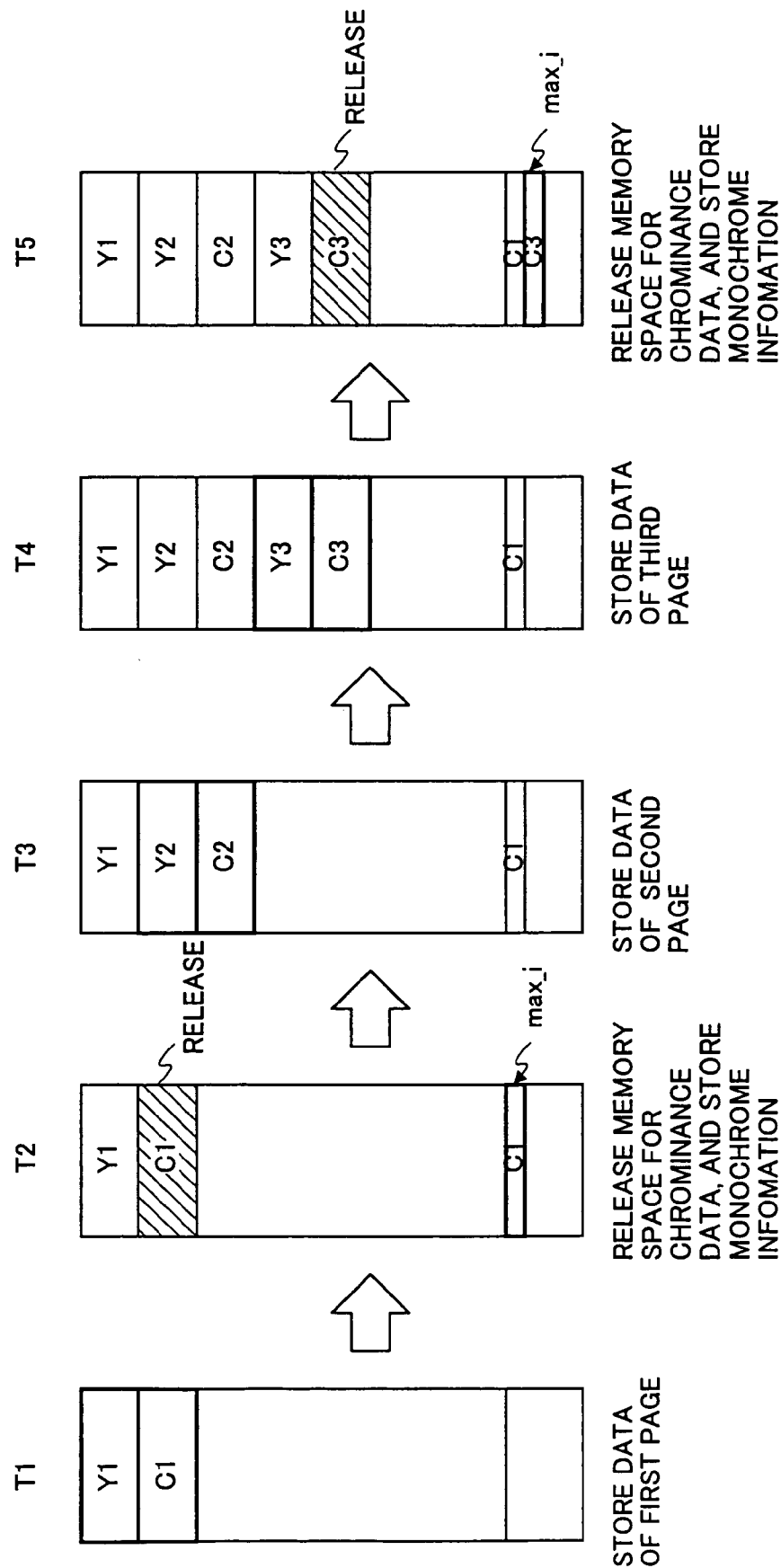
FIG. 8 is an illustrative drawing for explaining the way a memory-control unit stores three pages' worth of codes at specified addresses.

FIG. 8 is an illustrative drawing for explaining the way the memory-control unit 15 stores three pages' worth of codes at specified addresses.

As previously described, the distribution-measurement unit 14 performs the distribution-measurement process at the same time as the image coding unit 11 performs the fixed-length compressing and coding process.

As shown at the leftmost side of the figure, at the timing indicated as T1, the quantization coefficients of the luminance component Y1 and the chrominance components C1 that correspond to the first page are stored from the beginning of memory space in the memory unit 13. Concurrently with this, the distribution-measurement unit 14 performs the distribution-measurement processing, and checks whether the first page is a monochrome image.

When it is ascertained that the input image is a monochrome image, a memory space for the codes of the chrominance components C1 is released among the fixed-length codes stored in the memory unit 13, as shown at a timing T2 of FIG. 8. Releasing of the memory space does not necessarily involve clearing of the memory space, and it may suffice only if the memory space is marked as available for other use. At the same time as the releasing of the memory space, monochrome information (i.e., the index max_i indicative of an area that marked the maximum count) is stored at a predetermined address in the memory.

At a timing T3 of FIG. 8, the codes of the luminance component Y2 corresponding to the second page are written from the beginning of the memory space released from the chrominance components of the first page, according to memory addresses specified by the memory-control unit 15. Following this, the chrominance components C2 of the second page are stored in the memory.

In the example shown in FIG. 8, the second page is a color page, and the third page is a monochrome page. As a result, as shown at a timing T4, the luminance component Y3 and the chrominance components C3 of the third page are stored next following the chrominance components C2 of the second page. The chrominance components C3 of the third page are then released as shown at a timing T5.

At a time of image decoding, the image decoding unit 12 obtains the chrominance components Cb and Cr from the index max_i indicative of the area of a maximum count, and uses these chrominance components Cb and C4 over the entire image to complete the decoding processing. This makes it possible to reconstruct the original monochrome image despite the elimination of chrominance code data.

In this manner, a check as to whether the input image is a monochrome image is performed concurrently and in parallel with the process of compressing and encoding the image, and part of the memory space is released in response to the check results indicative of a monochrome image after the compressed and encoded codes are stored in the memory. This improves a coding efficiency for monochrome images. Further, since the check processing and the compression and encoding processing are carried out simultaneously, no extra time for the sake of performing the checking process is necessary, thereby achieving high-speed and efficient coding. Further, since the monochrome check of the present invention is not made by comparing an input image with any predetermined particular composition (e.g., Cb=Cr=0), the check process is applicable to any single-color composition.

Figure 9:
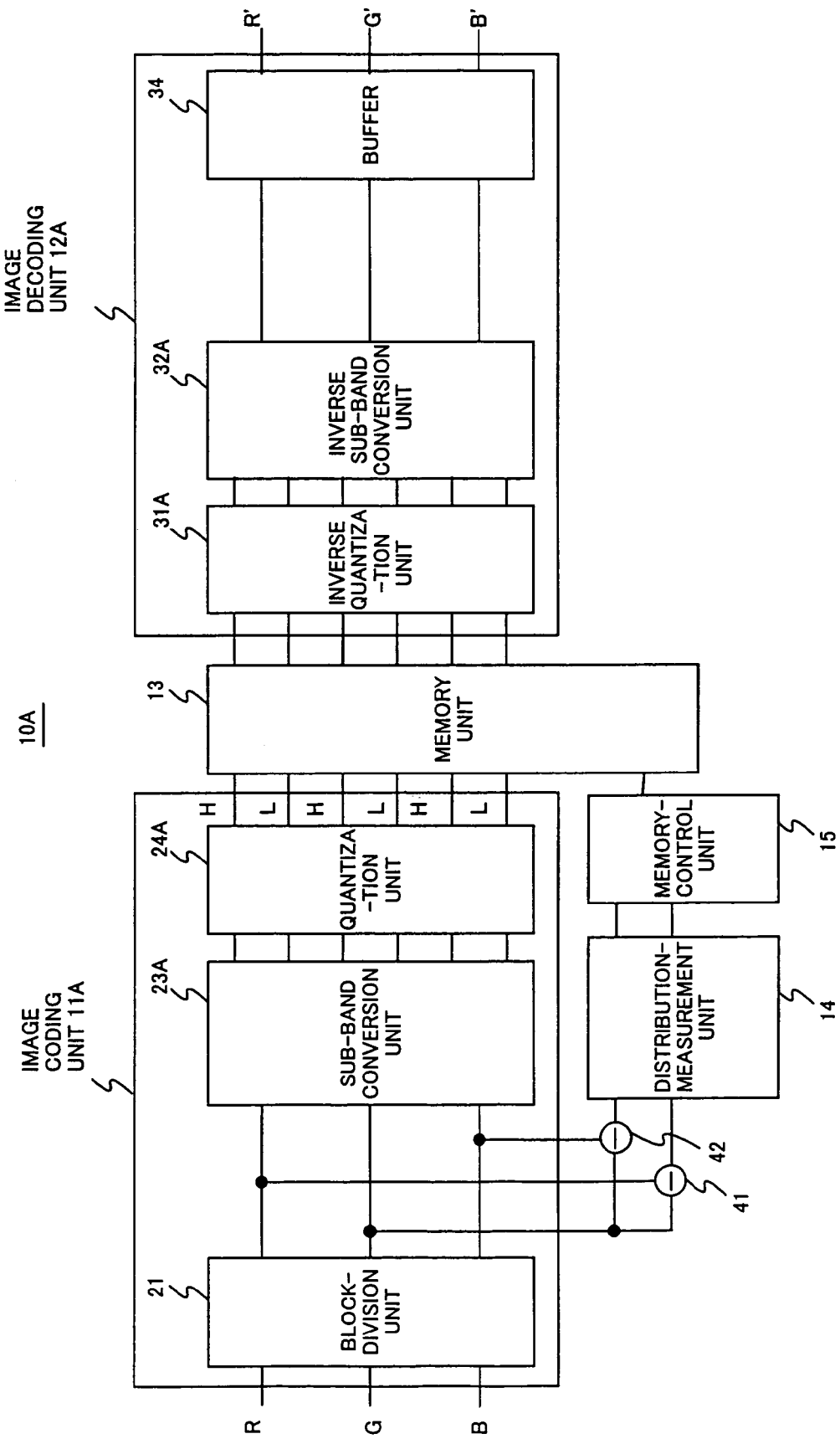
FIG. 9 is a block diagram of an image processing device according to a second embodiment of the present invention.

FIG. 9 is a block diagram of an image processing device according to a second embodiment of the present invention. In FIG. 9, the same elements as those of FIG. 1 are referred to by the same numerals, and a description thereof will be omitted.

An image processing device 10A of FIG. 9 includes an image coding unit 11A, an image decoding unit 12A, the memory unit 13, the distribution-measurement unit 14, and the memory-control unit 15.

The image coding unit 11A includes the block-division unit 21, a sub-band conversion unit 23A, and a quantization unit 24A. The image decoding unit 12A includes an inverse quantization unit 31A, an inverse sub-band conversion unit 32A, and the buffer unit 34.

Color image signals (R, G, B) are supplied to the block-division unit 21 of the image coding unit 11A. The block-division unit 21 supplies the color image signals (R, G, B) to the sub-band conversion unit 23A block by block.

The sub-band conversion unit 23A applies sub-band conversion separately to each color component of the R, G, and B data without any color conversion. The sub-band conversion itself is the same as that applied to each of the Y, Cb, and Cr signals obtained after the color conversion in the first embodiment. The quantization unit 24A quantizes the coefficients obtained by the sub-band conversion in a similar manner to that of the first embodiment.

Before the color image signals (R, G, B) are supplied from the block-division unit 21 to the distribution-measurement unit 14, subtraction units 41 and 42 compute subtractions (R-G) and (B-G), respectively. The distribution-measurement unit 14 measures the distribution of (R-G) and (B-G) over the entire image, and checks whether the distribution has a concentration within a predetermined range.

In the same manner as was described in connection with FIG. 4 through FIG. 6, occurrences are counted over the plane defined by (R-G) and (B-G), and a ratio of a maximum count to a total count is obtained. If the ratio exceeds a predetermined value, the image is ascertained as a monochrome image. Also, information regarding the area of a maximum count is stored in the memory in addition to the fixed-length codes. If the check results find that the input image is a monochrome image, a memory space assigned to R component codes and B component codes is released among the memory space for the fixed-length compressed codes.

At the time of image decoding, data of (R-G) and (B-G) corresponding to the area of a maximum count is obtained from the memory, and is applied to every part of the image. Namely, the processing in this case is space invariant processing. R and B in each image area are reconstructed from the data of (R-G) and (B-G) that are space invariant and the data of G that is space variant. Thereafter, decoding processing is carried out.

A big difference between the first embodiment and the second embodiment is whether the image data R, G, and B are converted into Y, Cb, and Cr signals. The second embodiment is based on the assumption that G is a proper approximation for Y, and so are (R-G) and (B-G) for Cr and Cb, respectively, without an exact color conversion. Color conversion will achieve higher efficiency in the coding process, but requires an extra circuit, an extra processing time, and extra cost for the conversion processing.

It should be noted that the conversion process used for the fixed-length coding is not limited to the sub-band conversion, but may be the DCT (discrete cosine transform), the Hadamard conversion, the BTC (block truncation coding), etc.

The quantization method of quantizing the conversion coefficients is not limited to that used in the embodiments described above. For example, quantization bits may be allocated to the high-band coefficients HL, LH, and HH of the chrominance components Cb and Cr. In this case, the high-band coefficients are referred to as structure information, and the low-band coefficients LL of the chrominance components Cb and Cr are referred to as color information.

Further, the distribution measurement process may be performed over the entire page, or may be carried out with respect to each of local areas defined within the same page. When the page is divided, fixed-length codes are produced with respect to each area, so that an ease of manipulating images is maintained, and so is an improvement of coding efficiency for a monochrome image.

Figure 10:
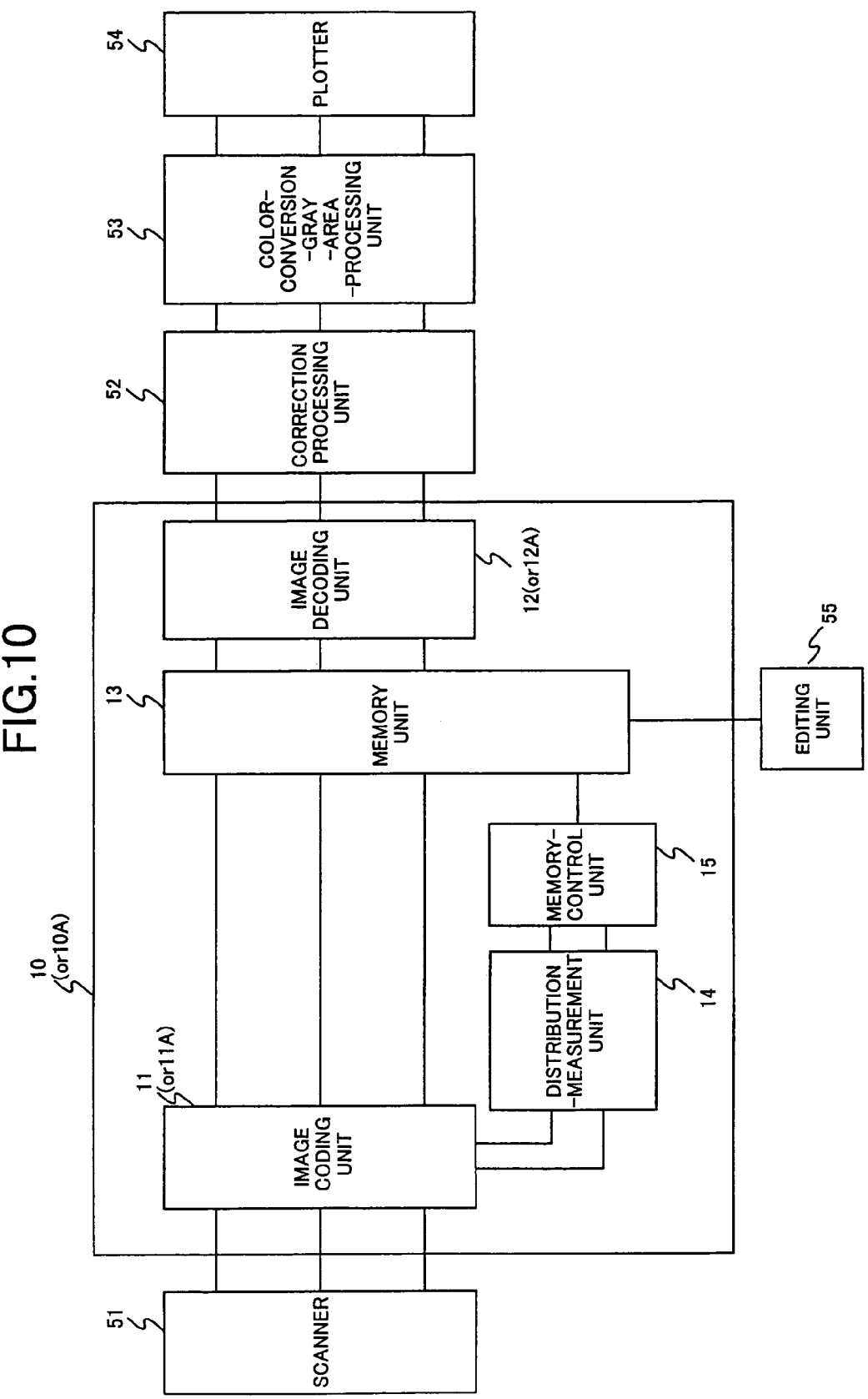
FIG. 10 is a block diagram of an image processing system to which the image processing device of the present invention is applied.

FIG. 10 is a block diagram of an image processing system to which the image processing device of the present invention is applied.

The image processing system of FIG. 10 implements a digital color copier or the like, and includes a scanner 51, the image processing device 10 of FIG. 1 (or the image processing device 10A of FIG. 9), a correction processing unit 52, a color-conversion-gray-area-processing unit 53, a plotter 54, and an editing unit 55.

The scanner 51 reads an original image, and supplies color image signals (R, G, B) to the image processing device 10 (or 10A). The image processing device 10 (or 10A) compresses and encodes the input image data, and stores the codes in the memory unit 13 as described in the previous embodiments. The editing unit 55 performs editing processes such as rotation, combination, superimposition, size change, etc., on the image data within the limited memory space. Since the fixed-length coding scheme is employed, memory addresses of the coded data and positions within the image to be edited can be easily matched. This helps to achieve high-speed editing processes.

At the time of printing, data stored in the memory unit 13 is returned to the original RGB data by the image decoding unit. Thereafter, the image data is subjected to image-quality correction by the correction processing unit 52 and color-conversion into CMYK data and gray-level correction by the color-conversion-gray-area-processing unit 53, followed by being supplied to and printed by the plotter 54.

When the present invention is applied to the image processing system such as a digital color copier as described above, a check as to whether the input image is a monochrome image is performed concurrently and in parallel with the process of compressing and encoding the image, and part of the memory space is released in response to the check results indicative of a monochrome image after the compressed and encoded codes are stored in the memory. This improves a coding efficiency for monochrome images. Further, since the check processing and the compression and encoding processing are carried out simultaneously, no extra time for the sake of performing the checking process is necessary, thereby achieving high-speed and efficient coding.

Moreover, the image processing method of the present invention may be performed through software programs running on a computer.

FIG. 11 is an illustrative drawing showing a configuration of a device which performs the image processing method of the present invention.

As shown in FIG. 11, the device for practicing the image coding method of the present invention is implemented by a computer such as a personal computer or an engineering workstation.

The device of FIG. 11 includes a computer 510, a display device 520 connected to a computer 510, a communication apparatus 523, and an input device. The input device may include a keyboard 521 and a mouse 522. the computer 510 includes a CPU 511, a RAM 512, a ROM 513, a secondary memory device 514 such as a hard drive, a detachable-medium memory device 515, and an interface unit 516.

The keyboard 521 and mouse 522 serve to provide user interface, and receive various commands for operating the computer 510 and user responses responding to requests from the computer 510. The display device 520 displays processing results obtained by the computer 510, and also displays various data that enable the user to interact with the computer 510. The communication apparatus 523 is used to communicate with a remote site, and is comprised of a modem, a network interface, or the like.

The image coding method of the present invention is provided as a computer program executable by the computer 510. The computer program is stored in a memory medium M that is detachably mounted to the detachable-medium memory device 515. The computer program is loaded from the memory medium M to the RAM 512 or to the secondary memory device 514 via the detachable-medium memory device 515. Alternatively, the computer program is stored in a memory medium (not shown) located at a remote site, and is loaded from the remote memory medium to the RAM 512 or to the secondary memory device 514 via the communication apparatus 523 and the interface unit 516.

When an instruction to execute the program is given by the user via the keyboard 521 and/or the mouse 522, the CPU 511 loads the program to the RAM 512 from the memory medium M, the remote memory medium, or the secondary memory device 514. The CPU 511 uses an available memory space of the RAM 512 as a work area to execute the program loaded to the RAM 512, and carry out processes of the computer program while interacting with the user as necessary. The ROM 513 stores therein control programs for controlling basic operation of the computer 510.

The computer program performs the steps of encoding image data including a plurality of color components to produce fixed-length codes, storing the codes in a memory, measuring a distribution of the color components concurrently with the encoding of the image data, and releasing a memory space assigned to part of the codes relating to colors in the memory if the distribution concentrates on a particular color composition, and recording data indicative of the particular color composition in the memory. Further, the computer program is used for practicing the image coding methods described in connection with the above embodiments.

Further, the present invention is not limited to these embodiments, but various variations and modifications may be made without departing from the scope of the present invention.

The present application is based on Japanese priority application No. 2000-264422 filed on Aug. 31, 2000, with the Japanese Patent Office, the entire contents of which are hereby incorporated by reference.

What is claimed is:

1. A device for processing images, comprising:
   a compressing/coding unit configured to encode image data including a plurality of color components to produce encoded image data;
   a memory unit configured to store the encoded image data produced by said compressing/coding unit, the memory unit having at least one memory space assigned to a part of the encoded image data, wherein the part of the encoded image data represents the plurality of color components;
   a distribution-measurement unit configured to measure a distribution of the plurality of color components by counting, with respect to each of a plurality of areas into which a color space is divided, a number of pixels of the encoded image data whose color components belong to a given area; and
   a memory-control unit configured to release the at least one memory space assigned to the part of the encoded image data and to record data indicative of one of the areas on which the distribution concentrates in said memory unit in response to a detection by said distribution-measurement unit that the distribution concentrates on said one of the areas.

2. The device as claimed in claim 1, wherein said compressing/coding unit includes:
   a color-conversion unit configured to convert an input image into the image data including the plurality of color components;
   a compression unit configured to compress the image data supplied from said color-conversion unit to provide compressed image data; and
   a quantization unit configured to quantize the compressed image data supplied from said compression unit.

3. The device as claimed in claim 2, wherein said compression unit is configured to perform sub-band conversion to compress the image data supplied from said color-conversion unit.

4. The device as claimed in claim 2, wherein said compressing/coding unit further includes a block-division unit configured to divide the input image into a plurality of blocks before the input image is supplied to said color-conversion unit.

5. The device as claimed in claim 1, wherein the encoded image data produced by said compressing/coding unit includes brightness information, structure information, and color information.

6. The device as claimed in claim 1, wherein said compressing/coding unit includes:
   a compression unit configured to compress the image data including the plurality of color components to provide compressed image data, wherein the plurality of color components are R, G, and B components; and
   a quantization unit configured to quantize the compressed image data supplied from said compression unit.

7. The device as claimed in claim 6, wherein said distribution-measurement unit measures the distribution of the plurality of color components with respect to a (R-G) component and a (B-G) component.

8. An image processing system, comprising:
   a scanner unit configured to read an original image;
   a compressing/coding unit configured to encode image data including a plurality of color components to produce encoded image data;
   a memory unit configured to store the encoded image data produced by said compressing/coding unit, the memory unit having at least one memory space assigned to a part of the encoded image data, wherein the part of the encoded image data represents the plurality of color components;
   a distribution-measurement unit configured to measure a distribution of the plurality of color components by counting, with respect to each of a plurality of areas into which a color space is divided, a number of pixels of the encoded image data whose color components belong to a given area;
   a memory-control unit configured to release the at least one memory space assigned to the part of the encoded image data and to record data indicative of one of the areas on which the distribution concentrates in said memory unit in response to a detection by said distribution-measurement unit that the distribution concentrates on said one of the areas; and
   a printer unit configured to print data obtained by decoding the encoded image data stored in said memory unit.

9. The image processing system as claimed in claim 8, further comprising an image decoding unit configured to:
   read the encoded image data and the data indicative of the one of the plurality of color components from said memory unit,
   decode the encoded image data so as to provide decoded image, and
   determine color components of the decoded image according to the data indicative of the one of the plurality of color components.

10. The image processing system as claimed in claim 8, wherein said compressing/coding unit includes:
    a color-conversion unit configured to convert the original image into the image data including the plurality of color components;
    a compression unit configured to compress the image data supplied from said color-conversion unit to provide compressed image data; and
    a quantization unit configured to quantize the compressed image data supplied from said compression unit.

11. The image processing system as claimed in claim 10, wherein said compression unit is configured to perform sub-band conversion to compress the image data supplied from said color-conversion unit.

12. The image processing system as claimed in claim 10, wherein said compressing/coding unit further includes a block-division unit configured to divide the original image into a plurality of blocks before the data of the original image is supplied to said color-conversion unit.

13. The image processing system as claimed in claim 8, wherein the encoded image data produced by said compressing/coding unit includes brightness information, structure information, and color information.

14. The image processing system as claimed in claim 8, wherein said compressing/coding unit includes:
    a compression unit configured to compress the image data including the plurality of color components to provide compressed image data, wherein the plurality of color components are R, G, and B components; and
    a quantization unit configured to quantize the compressed image data supplied from said compression unit.

15. The image processing system as claimed in claim 14, wherein said distribution-measurement unit measures the distribution of the plurality of color components with respect to a (R-G) component and a (B-G) component.

16. A method of encoding images, comprising steps of:
    encoding image data including a plurality of color components to produce encoded image data;
    assigning at least one memory space of a memory unit to a part of the encoded image data, wherein the part of the encoded image data represents the plurality of color components;
    measuring a distribution of the plurality of color components concurrently with encoding of the image data by counting, with respect to each of a plurality of areas into which a color space is divided, a number of pixels of the encoded image data whose color components belong to a given area; and
    releasing the at least one memory space assigned to the part of the encoded image data and recording data indicative of one of the areas on which the distribution concentrates in said memory in response to a detection by said distribution-measurement unit that the distribution concentrates on said one of the areas.

17. The method as claimed in claim 16, wherein encoding of the image data includes:
    compressing the image data including the plurality of color components to provide compressed image data, wherein the plurality of color components are R, G, and B components; and
    quantizing the compressed image data.

18. The method as claimed in claim 17, wherein measuring of the distribution of the plurality of color components includes measuring the distribution of the plurality of color components with respect to a (R-G) component and a (B-G) component.

19. A computer-readable medium having a program embodied therein for causing a computer to encode images, said program comprising program-code for:
    encoding image data including a plurality of color components to produce encoded image data;
    assigning at least one memory space of a memory unit to a part of the encoded image data, wherein the part of the encoded image data represents the plurality of color components;
    measuring a distribution of the plurality of color components concurrently with encoding of the image data by counting, with respect to each of a plurality of areas into which a color space is divided, a number of pixels of the encoded image data whose color components belong to a given area; and
    releasing the at least one memory space assigned to the part of the encoded image data and recording data indicative of one of the areas on which the distribution concentrates in said memory in response to a detection by said distribution-measurement unit that the distribution concentrates on said one of the areas.

20. The computer-readable medium as claimed in claim 19, wherein encoding of the image data includes:
    compressing the image data including the plurality of color components to provide compressed image data, wherein the plurality of color components are R, G, and B components; and
    quantizing the compressed image data.

21. The computer-readable medium as claimed in claim 20, wherein measuring of the distribution of the plurality of color components includes measuring the distribution of the plurality of color components with respect to a (R-G) component and a (B-G) component.

22. The device as claimed in claim 1, wherein said distribution-measurement unit is configured to measure the distribution of the plurality of color components while the image data including a plurality of color components is being encoded.

23. The device as claimed in claim 1, wherein the distribution concentrating on the one of the plurality of color components correlates to the one of the plurality of color components occupying at least 80% of the plurality of color components.

24. The device as claimed in claim 8, wherein said distribution-measurement unit is configured to measure the distribution of the plurality of color components while the image data including a plurality of color components is being encoded.

25. The device as claimed in claim 8, wherein the distribution concentrating on the one of the plurality of color components correlates to the one of the plurality of color components occupying at least 80% of the plurality of color components.

26. The device as claimed in claim 16, wherein the distribution concentrating on the one of the plurality of color components correlates to the one of the plurality of color components occupying at least 80% of the plurality of color components.

27. The device as claimed in claim 19, wherein the distribution concentrating on the one of the plurality of color components correlates to the one of the plurality of color components occupying at least 80% of the plurality of color components.

* * * * *